(12) United States Patent
Espy-Wilson et al.

(10) Patent No.: US 10,381,025 B2
(45) Date of Patent: *Aug. 13, 2019

(54) MULTIPLE PITCH EXTRACTION BY STRENGTH CALCULATION FROM EXTREMA

(71) Applicant: University of Maryland, College Park, College Park, MD (US)

(72) Inventors: Carol Espy-Wilson, Washington, DC (US); Srikanth Vishnubhotla, Greenbelt, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,648

(22) Filed: May 2, 2017

(65) Prior Publication Data
US 2018/0005647 A1 Jan. 4, 2018

Related U.S. Application Data

(60) Continuation of application No. 14/195,774, filed on Mar. 3, 2014, now Pat. No. 9,640,200, which is a
(Continued)

(51) Int. Cl.
*G10L 25/90* (2013.01)
*G10L 21/02* (2013.01)
(Continued)

(52) U.S. Cl.
CPC ............ *G10L 25/90* (2013.01); *G10L 15/063* (2013.01); *G10L 15/14* (2013.01)

(58) Field of Classification Search
CPC ............... G10L 21/0272; G10L 21/028; G10L 21/0308; G10L 25/03; G10L 25/90; G10L 21/02
(Continued)

(56) References Cited

U.S. PATENT DOCUMENTS 5,699,477 A 12/1997 McCree
5,812,970 A * 9/1998 Chan .................. G10L 21/0208
704/226

(Continued)

OTHER PUBLICATIONS

Vishnubhotla et al., "An algorithm for speech segmentation of co-channel speech", International Conference on Acoustics, Speech and Signal Processing. ICASSP 2009, Apr. 19, 2009, pp. 109 to 111. (Year: 2009).*

(Continued)

*Primary Examiner* — Martin Lerner
(74) *Attorney, Agent, or Firm* — Cooley LLP

(57) ABSTRACT

An apparatus includes a function module, a strength module, and a filter module. The function module compares an input signal, which has a component, to a first delayed version of the input signal and a second delayed version of the input signal to produce a multi-dimensional model. The strength module calculates a strength of each extremum from a plurality of extrema of the multi-dimensional model based on a value of at least one opposite extremum of the multi-dimensional model. The strength module then identifies a first extremum from the plurality of extrema, which is associated with a pitch of the component of the input signal, that has the strength greater than the strength of the remaining extrema. The filter module extracts the pitch of the component from the input signal based on the strength of the first extremum.

17 Claims, 7 Drawing Sheets

Related U.S. Application Data division of application No. 12/889,298, filed on Sep. 23, 2010, now Pat. No. 8,666,734.

(60) Provisional application No. 61/245,102, filed on Sep. 23, 2009.

(51) Int. Cl.
*G10L 21/0272* (2013.01)
*G10L 15/06* (2013.01)
*G10L 15/14* (2006.01)

(58) Field of Classification Search
USPC .............. 704/206, 207, 216, 217, 218, 226
See application file for complete search history.

(56) References Cited

U.S. PATENT DOCUMENTS

| | | | |
|---|---|---|---|
| 5,819,209 A | 10/1998 | Inoue | |
| 5,864,791 A | 1/1999 | Lee | |
| 6,188,979 B1 | 2/2001 | Ashley | |
| 6,359,988 B1 | 3/2002 | Espy-Wilson | |
| 6,453,284 B1* | 9/2002 | Paschall | G10L 21/028 704/206 |
| 6,470,309 B1 | 10/2002 | McCree | |
| 6,542,869 B1 | 4/2003 | Foote | |
| 6,564,182 B1 | 5/2003 | Gao | |
| 6,584,164 B1 | 6/2003 | Tuukkanen | |
| 6,711,528 B2 | 3/2004 | Dishman et al. | |
| 6,885,986 B1 | 4/2005 | Gigli | |
| 6,931,362 B2 | 8/2005 | Beadle et al. | |
| RE38,889 E | 11/2005 | Inoue | |
| 7,012,186 B2 | 3/2006 | Jung | |
| 7,092,881 B1* | 8/2006 | Aguilar | G10L 21/0272 704/207 |
| 7,257,535 B2* | 8/2007 | Aguilar | G10L 21/0272 704/263 |
| 7,457,744 B2 | 11/2008 | Lee et al. | |
| 7,529,661 B2 | 5/2009 | Chen | |
| 7,593,847 B2 | 5/2009 | Oh | |
| 7,672,836 B2 | 3/2010 | Lee | |
| 7,711,553 B2 | 5/2010 | Nam | |
| 7,752,038 B2 | 7/2010 | Laaksonen et al. | |
| 7,970,115 B1 | 6/2011 | Coughlan et al. | |
| 8,073,145 B2* | 12/2011 | Kondo | G10L 21/0272 704/207 |
| 8,107,321 B2* | 1/2012 | Kepesi | G01S 3/786 367/124 |
| 8,666,734 B2* | 3/2014 | Espy-Wilson | G10L 25/90 704/216 |
| 8,738,370 B2 | 5/2014 | Mitsuyoshi | |
| 9,640,200 B2* | 5/2017 | Espy-Wilson | G10L 25/90 |
| 2003/0177001 A1 | 9/2003 | Chen | |
| 2003/0200092 A1 | 10/2003 | Gao et al. | |
| 2004/0024590 A1 | 2/2004 | Lee | |
| 2004/0030555 A1 | 2/2004 | van Santen | |
| 2004/0054527 A1 | 3/2004 | Quatieri, Jr. | |
| 2005/0149321 A1 | 7/2005 | Kabi | |
| 2005/0195990 A1* | 9/2005 | Kondo | G10L 21/0272 381/92 |
| 2006/0111900 A1 | 5/2006 | Kim | |
| 2007/0174048 A1 | 7/2007 | Oh | |
| 2008/0201138 A1 | 8/2008 | Visser | |
| 2009/0210220 A1 | 8/2009 | Mitsuyoshi | |
| 2009/0254340 A1* | 10/2009 | Sun | G10L 21/0208 704/226 |
| 2009/0326930 A1 | 12/2009 | Kawashima | |
| 2010/0017201 A1 | 1/2010 | Tanaka et al. | |
| 2010/0042407 A1 | 2/2010 | Crockett | |
| 2010/0125452 A1 | 5/2010 | Sun | |
| 2010/0274554 A1 | 10/2010 | Orr et al. | |
| 2010/0305944 A1* | 12/2010 | Sun | G10L 25/90 704/207 |
| 2011/0071824 A1 | 3/2011 | Espy-Wilson et al. | |
| 2011/0191102 A1 | 8/2011 | Espy-Wilson et al. | |
| 2011/0255700 A1 | 10/2011 | Maxwell et al. | |
| 2012/0089396 A1 | 4/2012 | Patel et al. | |
| 2013/0142369 A1 | 6/2013 | Zhang et al. | |
| 2014/0177853 A1 | 6/2014 | Toyama | |
| 2015/0012273 A1 | 1/2015 | Espy-Wilson et al. | |

OTHER PUBLICATIONS

International Search Report and Written Opinion for PCT/US2011/052982, dated Feb. 8, 2012.

Notice of Allowance issued by the United States Patent and Trademark Office for U.S. Appl. No. 12/889,298, dated Oct. 15, 2013, 13 pages.

Final Office Action issued by The United States Patent and Trademark Office for U.S. Appl. No. 12/889,298, dated Jul. 5, 2013, 14 pages.

Non-Final Office Action issued by The United States Patent and Trademark Office for U.S. Appl. No. 12/889,298, dated Feb. 14, 2013, pages.

Notice of Allowance issued by The United States Patent and Trademark Office for U.S. Appl. No. 14/195,774, dated Dec. 12, 2016, 8 pages.

Non-Final Office Action issued by The United States Patent and Trademark Office for U.S. Appl. No. 14/195,774, dated May 31, 2016, 15 pages.

Ellis, D. "Model-Based Scene Analysis" Computational Auditory Scene Analysis (IEEE, 2006), Chapter 4, pp. 115-146.

Brown, G. et al., "Computational auditory scene analysis", Computer Speech and Language, vol. 8, 1994, pp. 297-336.

Chakraborty et al., "Pitch Tracking of Acoustic Signals based on Average Squared Mean Difference Function", Signal, Image and Video Processing, Dec. 2009, vol. 3, Issue 4, pp. 319 to 327.

De Cheveigné, A., "A Mixed Speech F0 Estimation Algorithm", Laboratoire de Linguistique Formelle, CNRS-Université Paris 7, Paris, France, 1993.

De Cheveigné, A., "Separation of concurrent harmonic sounds: Fundamental frequency estimation and a time-domain cancellation model of auditory processing", J. Acoust. Soc. Am., vol. 93, No. 6, Jun. 1993, pp. 3271-3290.

De Marchi, S. et al., "Stability of kernel-based interpolation", Adv Comput Math, vol. 32, 2010, pp. 155-161.

Deshmukh, O. et al., "Use of Temporal Information: Detection of Periodicity, Aperiodicity, and Pitch in Speech", IEEE Transactions on Speech and Audio Processing, vol. 13, No. 5, Sep. 2005, pp. 776-786.

Gerlach et al., "Evaluation of Joint Position-Pitch Estimation Algorithm for Localising Multiple Speakers in Adverse Acoustic Environments", ICASSP 2011, 2 Pages.

Le Roux, J. et al., "Single and Multiple F0 Contour Estimation Through Parametric Spectrogram Modeling of Speech in Noisy Environments", IEEE Transactions on Audio, Speech, and Language Processing, vol. 15, No. 4, May 2007, pp. 1135-1145.

Parsons, T., "Separation of speech from interfering speech by means of harmonic selection", J. Acoust. Soc. Am., vol. 60, No. 4, Oct. 1976, pp. 911-918.

Shao et al., "Co-Channel Speaker Identification using Usable Speech Extraction Based on Multi-Pitch Tracking", 2003 International Conference on Acoustics, Speech, and Signal Processing, 2003, Proceedings ICASSP 2003, vol. II, pp. II-205 to II-208.

Vishnubhotla, S. et al., "An Algorithm for Multi-Pitch Tracking in Co-Channel Speech", 156th Meeting of the Acoustical Society of America, Miami, FL, Nov. 13, 2008.

Vishubhotla, S. et al., "An Algorithm for Multi-Pitch Tracking in Co-Channel Speech", Proc. of the Intl. Conf. on Acoustics, Speech & Signal Processing, 2009 (ICASSP 2009), Taipei, Apr. 19-24, 2009.

Wu, M. et al., "A Multipitch Tracking Algorithm for Noisy Speech", IEEE Transactions on Speech and Audio Processing, vol. 11, No. 3, May 2003, pp. 229-241.

\* cited by examiner

MULTIPLE PITCH EXTRACTION BY STRENGTH CALCULATION FROM EXTREMA

CROSS-REFERENCE TO RELATED APPLICATIONS

This application claims priority to and is a continuation of U.S. patent application Ser. No. 14/195,774, filed Mar. 3, 2014, entitled "Multiple Pitch Extraction by Strength Calculation from Extrema," now U.S. Pat. No. 9,640,200 issued May 2, 2017, which claims priority to divisional of U.S. patent application Ser. No. 12/889,298, entitled "Systems and Methods for Multiple Pitch Tracking," filed Sep. 23, 2010, now U.S. Pat. No. 8,666,734 issued Mar. 4, 2017, which claims priority to U.S. Provisional Patent Application No. 61/245,102, entitled, "System and Algorithm for Multiple Pitch Tracking in Adverse Environments," filed Sep. 23, 2009; the disclosures of each of which are hereby incorporated by reference in their entireties.

This application is related to U.S. Provisional Application No. 61/299,776, entitled "Method to Separate Overlapping Speech Signals From a Speech Mixture for Use in a Segregation Algorithm," filed Jan. 29, 2010; the disclosure of which is hereby incorporated by reference in its entirety.

STATEMENT REGARDING FEDERALLY FUNDED RESEARCH

This disclosure was made with government support under grant number BCS-0519256 awarded by the National Science Foundation. The government has certain rights in the disclosure.

BACKGROUND

Some embodiments relate to speech detection, and more particularly, to multiple pitch detection process.

Known speech detection processes do not provide accurate pitch period estimates when a speech signal includes noise or other interfering harmonics. One reason for this is that known speech detection processes model speech signals based on one-dimensional functions. Data generated by such one-dimensional functions can be more susceptible to variations and deviations from true values due to noise or harmonic interactions.

Known speech detection processes also do not provide accurate pitch period estimates when a signal includes two voices that have substantially the same pitch or have pitches that are multiples of one another. Because the pitch periods of the two voices are similar, known speech detection processes cannot distinguish the pitch period of one voice from the pitch period of the other voice. As a result, some known speech detection processes typically are only suitable for use on signals that include no voice, one voice or two voices that do not have the same pitch.

Thus, a need exists for an improved system and method for multiple pitch detection. More specifically, a need exists for an improved system and method for analyzing speech signals based on multi-dimensional data. Additionally, a need exists for an improved system and method for estimating pitch periods when two or more voices have similar pitches.

SUMMARY

In some embodiments, an apparatus includes a function module, a strength module, and a filter module. The function module compares an input signal, which has a component, to a first delayed version of the input signal and a second delayed version of the input signal to produce a multi-dimensional model. The strength module calculates a strength of each extremum from a plurality of extrema of the multi-dimensional model based on a value of at least one of a plurality of opposite extremum of the multi-dimensional model. The strength module then identifies a first extremum from the plurality of extrema, which is associated with a pitch of the component of the input signal, that has the strength greater than the strength of the remaining extrema. The filter module extracts the pitch of the component from the input signal based on the strength of the first extremum.

DETAILED DESCRIPTION

Figure 1:
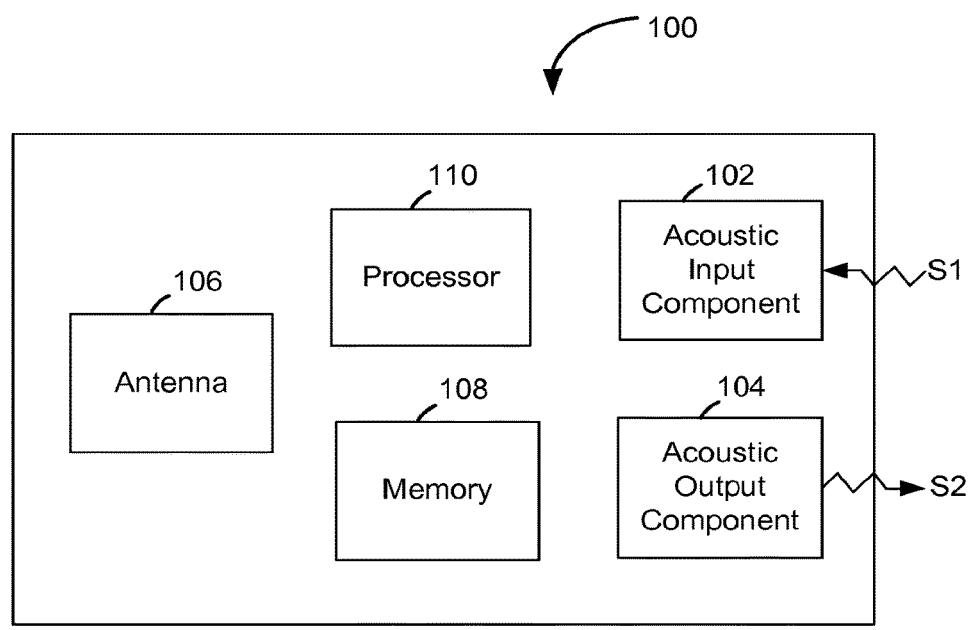
FIG. 1 is a schematic illustration of a device according to an embodiment.

Systems and methods for multiple pitch ("multi-pitch") processing are described herein. In some embodiments, a processor-readable medium stores code representing instructions to cause a processor to compare an input signal having a component to a first delayed version of the input signal and a second delayed version of the input signal to produce a function. In some embodiments, the component of the input signal is a voiced speech signal. The code further represents instructions to cause the processor to compare a value of the function at each extremum from a plurality of extrema of the function based on a value of at least one opposite extremum of the function to produce a computed value. The computed value is a function of the extremum and at least one opposite extremum. The code represents instructions to cause the processor to calculate a strength of each extremum from the plurality of extrema based on the computed value at that extremum. An extremum from the plurality of extrema has the strength greater than the strength for the remaining extrema and is associated with the component of the input signal.

In some embodiments, an apparatus includes a function module, a strength module, and a filter module. The function module compares an input signal, which has a component, to a first delayed version of the input signal and a second delayed version of the input signal to produce a multi-dimensional model. The strength module calculates a strength of each extremum from a plurality of extrema of the multi-dimensional model based on a value of each adjacent opposite extremum of the multi-dimensional model. The strength module then identifies a first extremum from the plurality of extrema, which is associated with a pitch of the component of the input signal, that has the strength greater than the strength of the remaining extrema. The filter module extracts the pitch of the component from the input signal based on the strength of the first extremum.

In general, speech can be distinguished from other signals or sounds (e.g., noise) based on its pitch. The pitch of human speech ranges from approximately 60 Hertz (Hz) to approximately 500 Hz. More particularly, the pitch of a child's voice ranges from 200 to 500 Hz, while the pitch of an adult female ranges from 150 Hz to 350 Hz and an adult male ranges from 80 to 200 Hz. Many of the background noises or sounds that make speech indecipherable to a listener have pitches well above or below the human speech ranges. For example, the pitch of an ambulance siren is approximately 1,000 Hz. Using this information, pitches that fall below 60 Hz or rise above 500 Hz can be filtered from a signal so that the targeted speech component of the signal is more easily identified. The result of the filtered signal is speech that is more understandable and less affected by noise. But, noise between 60 Hz and 100 Hz still is present within the filtered signal and provides a challenge for separating this remaining noise.

The word "component" as used herein refers to a signal or a portion of a signal, unless otherwise stated. A component can be related to speech, music, noise (stationary, or non-stationary), or any other sound. In general, speech includes a voiced component and/or an unvoiced component. A component can be periodic, substantially periodic, quasi-periodic, substantially aperiodic or aperiodic. For example, a voiced component is periodic, substantially periodic or quasi-periodic. An unvoiced component, however, is aperiodic or substantially aperiodic (e.g., the sound "sh"). A substantially periodic component can, for example, refer to a signal that, when graphically represented in the time domain, exhibits a repeating pattern. A substantially aperiodic component can, for example, refer to a signal that, when graphically represented in the time domain, does not exhibit a repeating pattern.

The word "pitch" as used herein refers to the frequency of a sound having some periodicity. A component generally has a pitch when that component is periodic or substantially periodic. A voiced component of speech (e.g., the vowel sound "ae" in the word "grab") has a pitch because it is periodic (or substantially periodic) and, in the frequency domain, has energy at its fundamental frequency and at its multiples (e.g., inter-harmonics). An unvoiced component of speech (e.g., the sound "sh" from the word "shout"), however, does not have a pitch because it is aperiodic (or substantially aperiodic). It should be understood that there are many components, which do not include speech, that have a pitch. For example, the sound of a siren is periodic and has a pitch.

FIG. 1 is a schematic illustration of an audio device 100 that includes an implementation of a multi-pitch detector process. For purposes of this embodiment, the audio device 100 is described as operating in a manner similar to a cell phone. It should be understood, however, that the audio device 100 can be any suitable audio device for storing and/or using the multi-pitch detection process. For example, in some embodiments, the audio device 100 can be a personal digital assistant (PDA), a medical device (e.g., a hearing aid or cochlear implant), a recording or acquisition device (e.g., a voice recorder), a storage device (e.g., a memory storing files with audio content), a computer (e.g., a supercomputer or a mainframe computer) and/or the like.

The audio device 100 includes an acoustic input component 102, an acoustic output component 104, an antenna 106, a memory 108, and a processor 110. Any one of these components can be arranged within (or at least partially within) the audio device 100 in any suitable configuration. Additionally, any one of these components can be connected to another component in any suitable manner (e.g., electrically interconnected via wires or soldering to a circuit board, a communication bus, etc.).

The acoustic input component 102, the acoustic output component 104, and the antenna 106 can operate, for example, in a manner similar to any acoustic input component, acoustic output component and antenna found within a cell phone. For example, the acoustic input component 102 can be a microphone, which can receive sound waves and then convert those sound waves into electrical signals for use by the processor 110. The acoustic output component 104 can be a speaker, which is configured to receive electrical signals from the processor 110 and output those electrical signals as sound waves. Further, the antenna 106 is configured to communicate with, for example, a cell repeater or mobile base station. In embodiments where the audio device 100 is not a cell phone, the audio device 100 may or may not include any one of the acoustic input component 102, the acoustic output component 104, and/or the antenna 106.

The memory 108 can be any suitable memory configured to fit within or operate with the audio device 100 (e.g., a cell phone), such as, for example, a read-only memory (ROM), a random access memory (RAM), a flash memory, and/or the like. In some embodiments, the memory 108 is removable from the device 100. In some embodiments, the memory 108 can include a database.

The processor 110 is configured to implement the multi-pitch detector process for the audio device 100. In some embodiments, the processor 110 stores software implementing the process within its memory architecture. The processor 110 can be any suitable processor that fits within or operates with the audio device 100 and its components. For example, the processor 110 can be a general purpose processor that executes software stored in memory; in other embodiments, the process can be implemented within hardware, such as a field programmable gate array (FPGA), or application-specific integrated circuit (ASIC). In some embodiments, the audio device 100 does not include the processor 110. In other embodiments, the functions of the processor can be allocated to a general purpose processor and, for example, a digital signal processor (DSP).

In use, the acoustic input component 102 of the audio device 100 receives sound waves S1 from its surrounding environment. These sound waves S1 can include the speech (i.e., voice) of the user talking into the audio device 100 as well as any background noises. For example, in instances where the user is walking outside along a busy street, the acoustic input component 102 can pick up sounds from sirens, car horns, or people shouting or conversing, in addition to picking up the user's voice. The acoustic input component 102 converts these sound waves S1 into electrical signals, which are then sent to the processor 110 for processing. The processor 110 executes the software, which implements the multi-pitch detection process. The multi-pitch detection process can analyze the electrical signals in one of the manners described below (see, for example, FIGS. 4, 7 and 8). The electrical signals are then filtered based on the results of the multi-pitch detection process so that the undesired sounds (e.g., other speakers, background noise) are substantially removed from the signals and the remaining signals represent a more intelligible version of the user's speech (see, for example, FIGS. 10 and 11).

In some embodiments, the audio device 100 can filter signals received via the antenna 106 (e.g., from a different audio device) using the multi-pitch detection process. For example, in embodiments where the received signal includes speech as well as undesired sounds (e.g., distracting background noise), the audio device 100 can use the process to filter the received signal and then output the sound waves S2 of the filtered signal via the acoustic output component 104. As a result, the user of the audio device 100 can hear the voice of a distant speaker with minimal to no background noise.

In some embodiments, the multi-pitch detection process can be incorporated into the audio device 100 via the processor 110 and/or memory 108 without any additional hardware requirements. For example, in some embodiments, the multi-pitch detection process is pre-programmed within the audio device 100 (i.e., the processor 110) prior to the audio device 100 being distributed in commerce. In other embodiments, a software version of the multi-pitch detection process stored in the memory 108 can be downloaded to the audio device 100 through occasional, routine or periodic software updates after the audio device 100 has been purchased. In yet other embodiments, a software version of the multi-pitch detection process can be available for purchase from a provider (e.g., a cell phone provider) and, upon purchase of the software, can be downloaded to the audio device 100.

Figure 2:
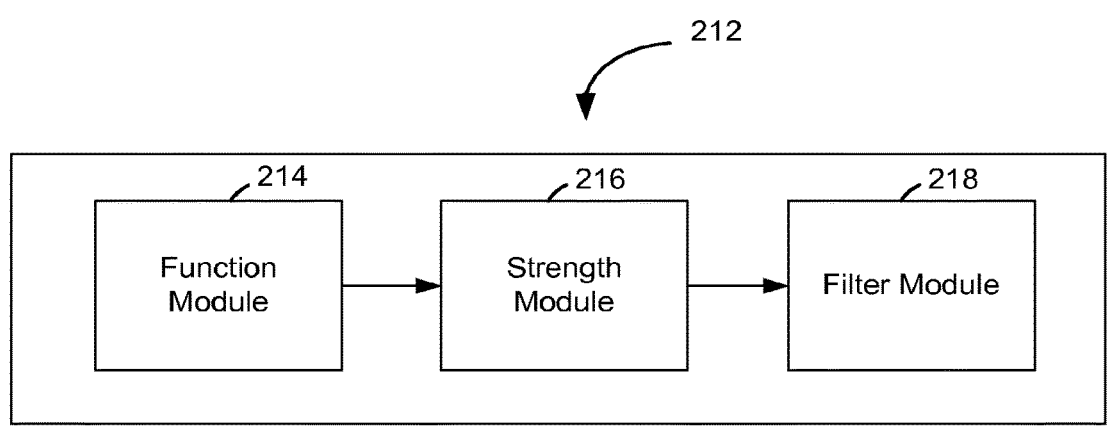
FIG. 2 is a schematic illustration of a processor according to an embodiment.

In some embodiments, the processor 110 includes one or more modules (e.g., a module of computer code to be executed in hardware, or a set of processor-readable instructions to be executed in hardware) that execute the multi-pitch detection process. For example, FIG. 2 is a schematic illustration of a processor 212 (e.g., a DSP or other processor) having a function module 214, a strength module 216, and a filter module 218 to execute a multi-pitch detection process, according to an embodiment. The processor 212 can be integrated into or included in any suitable audio device, such as, for example, the audio devices described above with reference to FIG. 1. In some embodiments, the processor 212 is an off-the-shelf product that can be programmed to include the function module 214, the strength module 216 and/or the filter module 218 and then added to the audio device after manufacturing (e.g., software stored in memory and executed in hardware). In other embodiments, however, the processor 212 is incorporated into the audio device at the time of manufacturing (e.g., software stored in memory and executed in hardware or implemented in hardware). In such embodiments, the function module 214, the strength module 216 and/or the filter module 218 can either be programmed into the audio device at the time of manufacturing or downloaded into the audio device after manufacturing.

In use, the processor 212 receives an input signal (shown in FIG. 3) from the audio device within which the processor 212 is integrated (see, for example, audio device 100 in FIG. 1). For purposes of simplicity, the input signal is described herein as having no more than two components at any given time, and at some instances of time may have zero components (e.g., silence). For example, in some embodiments, the input signal can have two voiced components (i.e., two speakers) during a first time period, one component during a second time period, and zero components during a third time period. Although this example is discussed with no more than two components, it should be understood that the input signal can have any number of components at any given time.

Figure 5:
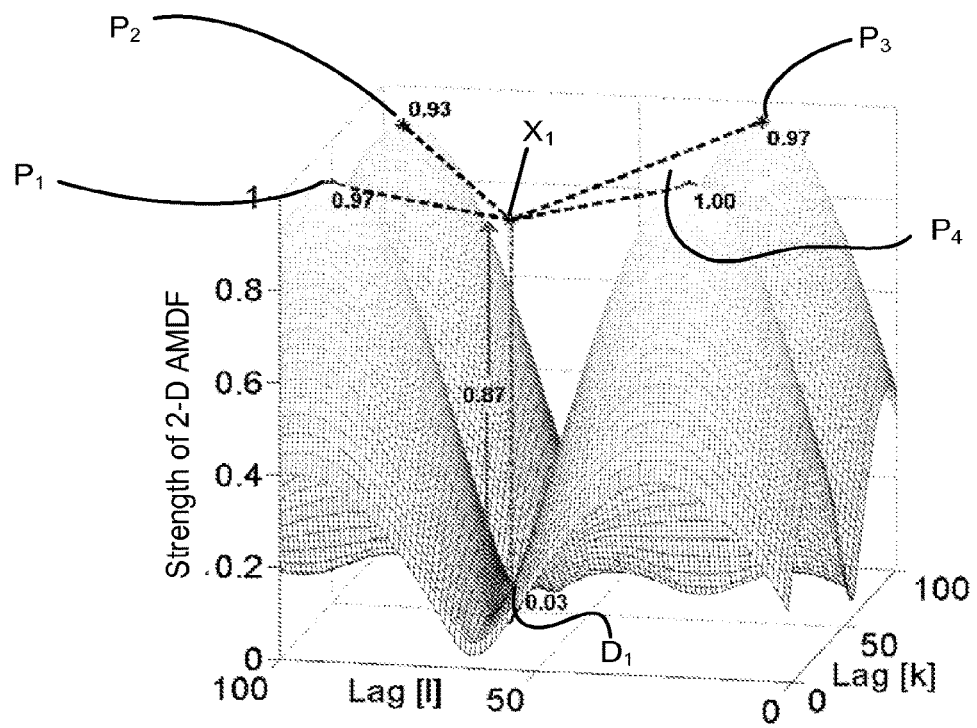
FIG. 5 is a three-dimensional model of a function according to an embodiment.
Figure 6:
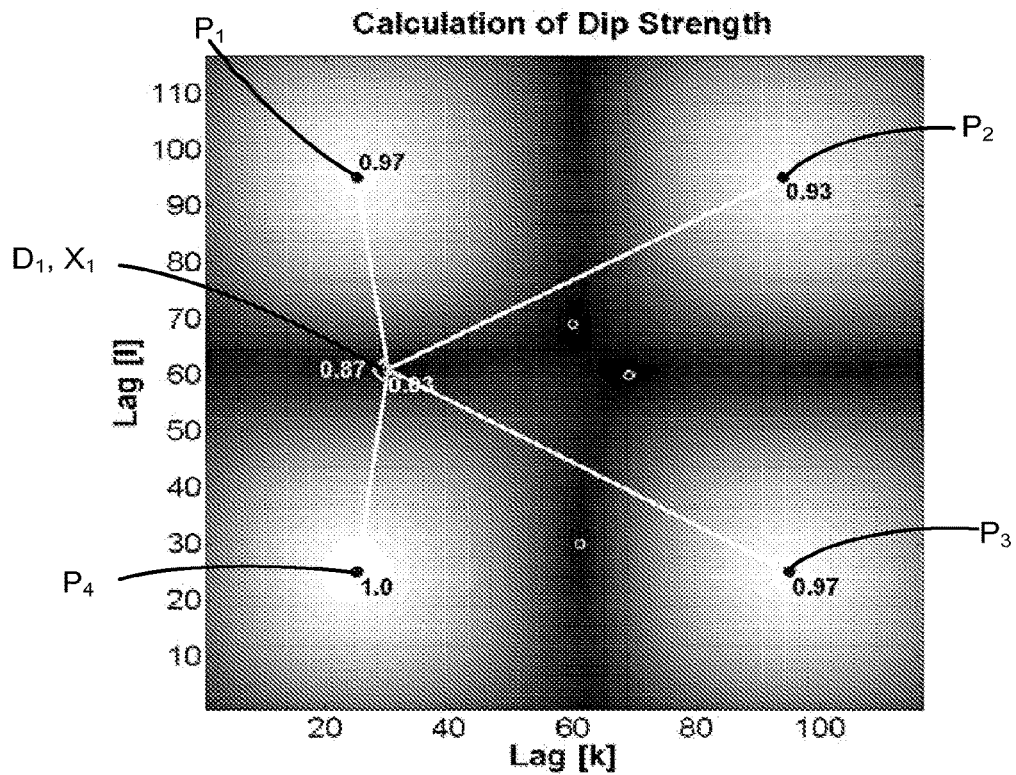
FIG. 6 is a two-dimensional model of the function illustrated in FIG. 5.

The input signal is first processed by the function module 214. The function module 214 can compare the input signal to at least a first delayed version of the input signal and a second delayed version of the input signal using one of the methods described below (see, for example, FIG. 4 and the related discussion). The function module 214 then uses the results of this comparison to produce a function (i.e., a model) of the input signal. An example of such a model is shown in FIGS. 5 and 6. As will be discussed in more detail herein, the model includes many maxima (peaks) and minima (valleys). These minima and maxima can be used to determine the pitch of the components of the input signal.

The strength module 216 can analyze the maxima and minima of the model generated by the function module 214. Using the values of the maxima and minima, the strength module 216 can determine the pitch of each component of the input signal. For example, in embodiments where the input signal (or portion thereof) includes a first voiced component and a second voiced component, the strength module 216 can identify the pitch of both voiced components. If, however, the input signal (or portion thereof) includes a voiced component and an unvoiced component, the strength module 216 just identifies the pitch of the voiced component since the unvoiced component does not have a pitch.

In some embodiments, the strength module 216 can determine the pitches by calculating dip strengths, as described in more detail below. In other embodiments, however, the strength module 216 can determine the pitches by calculating peak strengths, as also described in more detail below. In yet other embodiments, the strength module 216 can determine the pitches based on values of the model (e.g., maxima and/or minima) in other manners.

Once the pitches of the components of the input signal are identified by the strength module 216, the filter module 218 can filter the input signal based on these pitches. For example, when the strength module 216 identifies a voiced component having a pitch of 200 Hz, the filter module 218 can extract that identified voiced component from the input signal. In some embodiments, the filter module 218 can send that extracted voiced component to, for example, an antenna of the device within which the processor 212 is implemented, such that the extracted voiced component is transmitted to another device where the voiced component can be heard without interference from the remaining components of the input signal.

Figure 3:
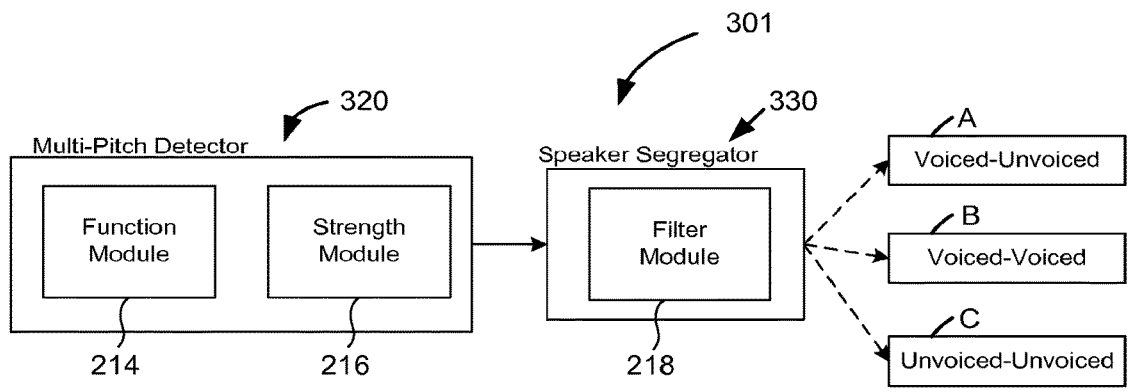
FIG. 3 is a block diagram of a system according to an embodiment.

In some embodiments, the filter module 218 performs processes not included in the multi-pitch detection process. For example, FIG. 3 is a schematic illustration of an embodiment where the software includes both a multi-pitch detector 320 and a speaker segregator 330. The multi-pitch detector 320 is implemented, at least in part, via the function module 214 and the dip strength module 216, while the speaker segregator 330 is implemented, at least in part, via the filter module 218. A detailed description of the methods and uses of the speech segregator can be found in U.S. Patent Provisional Application No. 61/299,776, entitled "Method to Separate Overlapping Speech Signals From a Speech Mixture for Use in a Segregation Process," filed Jan. 29, 2010; the disclosure of which is hereby incorporated by reference in its entirety.

The multi-pitch detector 320 can simply detect or identify the pitches of the components of the input signal and then the speaker segregator 330 can filter or segregate based on those pitches. For example, as shown in FIG. 3, the speaker segregator 330 can separate voiced components from unvoiced components (A), voiced components from other voiced components (B), or unvoiced components from other unvoiced components (C). Details regarding the processes of the speaker segregator 330 are discussed below with reference to FIG. 9.

FIGS. 1-3 provide an overview of the types of devices, components and modules that can be used to implement the multi-pitch detection process. The remaining figures illustrate and describe the multi-pitch detection process and its processes in greater detail. It should be understood that the following processes and methods can be implemented in any hardware-based module(s) (e.g., a DSP) or any software-based module(s) executed in hardware in any of the manners discussed above with respect to FIGS. 1-3, unless otherwise specified.

Figure 4:
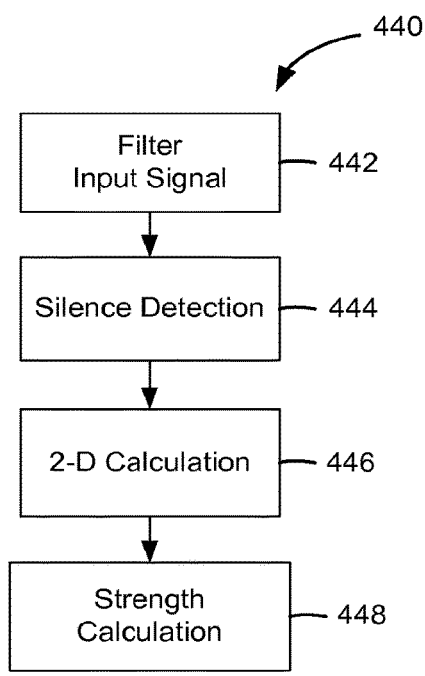
FIG. 4 is a flow chart of a method according to an embodiment.

FIG. 4 is a flow chart of a method 440 for applying the multi-pitch detection process to an input signal. The input signal can have any number of components, as discussed above. The input signal can be, for example, derived from a speaker talking into a microphone. In this particular instance, the speaker's voice is considered an input signal, which includes at least one voiced component and/or unvoiced component. In some embodiments, the input signal can otherwise include noise or voice (other than the audio device user) that is picked up by the microphone. In some embodiments, the microphone can pick up a second voice intended to be heard (e.g., two speakers talking into the same microphone). In other embodiments, however, the input signal can be derived from two speakers having a conversation with each other using different devices and speaking into different microphones (e.g., a recorded telephone conversation). In yet other embodiments, the input signal can be derived from music (e.g., recorded music being played back on an audio device).

The multi-pitch detection process includes filtering the input signal, at 442. The input signal can be filtered using, for example, a filter bank that splits the input signal into a set of channels (i.e., frequencies). The filter bank can be any suitable filter bank, such as, for example, a perfect reconstruction (PR) filter bank or a gamma-tone filter bank, with center frequencies ranging from 100 Hz to just below half the sampling rate (discussed below). In some embodiments, the frequency ranges and other parameters of the filter bank are chosen and/or programmed to resemble human auditory hair cell processing. Although the filtering 442 is discussed below with reference to a filter bank, in other embodiments, the filtering 442 can be accomplished by any suitable filtering methodology. In yet other embodiments, filtering 442 is optional and the method does not include filtering 442.

As part of the filtering 442 using a filter bank, each channel is windowed to W samples to form a Time-Frequency (T-F) unit for that channel. Each of the T-F units corresponding to the same time are grouped as a frame. The length of each sample W can range, for example, from approximately 7.5 milliseconds (ms) to approximately 50 ms. In some embodiments, the sample length W includes at least two pitch periods. In some embodiments, the sample length, W, can vary over time depending on the number of speakers (or components) within given frames. For example, when one speaker is present, the frame can have a length of 20 ms. When two speakers are present, however, the frame can have a length of 40 ms. The sampling rate can be measured in frames per second (fps) and can range from approximately 50 fps to approximately 400 fps with the desired rate being close to 100 fps.

Once the input signal is filtered, the multi-pitch detection process performs silence detection, at 444. More specifically, the frames and T-F units are evaluated according to two thresholds to determine whether the frame and/or T-F unit is "silent" or "non-silent." First, each frame is evaluated and determined to be non-silent if that frame's energy (e.g., sound level) is no more than 35 decibels (dB) below the maximum energy computed across all frames. The frames that fall below the frame threshold are considered silent and are ignored (or extracted) for the remainder of the process 440. Although this frame threshold is described at being 35 dB, in other embodiments, the frame threshold can be any suitable threshold for determining a silent or non-silent frame.

The frames determined to be non-silent are next evaluated. A channel within a given frame is considered non-silent if its energy is no more, for example, than 45 dB below the maximum channel energy that has been computed up to that point, including the present frame. Although this T-F unit threshold is described as being 45 dB, in other embodiments, the T-F unit threshold can be any suitable threshold for determining a silent or non-silent T-F unit.

As indicated, those frames and T-F units that are considered silent are extracted and/or discarded at 444 so that no further processing is performed on those frames and T-F units. Silence detection 444 can increase signal processing efficiency by preventing any unnecessary processing from occurring on frames and T-F units that are void of any relevant data (e.g. speech components). The remaining frames and T-F units, which are considered non-silent, are further processed as follows. In some embodiments, silence detection 444 is optional and the method 440 does not include silence detection 444. As such, all of the frames and T-F units, regardless of whether they are silent or non-silent, are processed as follows.

A two-dimensional (2-D) function is calculated for each of the non-silent frames, at 446. The 2-D function models periodic or substantially periodic signals having a pitch, and ignores all other signals that are aperiodic or substantially aperiodic, as defined above. The 2-D function is substantially insensitive to inter-harmonics (e.g., beat frequencies) and, as such, can be used to more accurately estimate pitches. For purposes of this discussion, the 2-D function is an average magnitude difference function (AMDF). It should be understood, however, that the multi-pitch detection process can use any suitable multi-dimensional function. For example, as discussed below, the 2-D function can be an autocorrelation function (ACF).

The 2-D AMDF (normalized) is defined as:

$$\gamma_n[k, l] = \frac{1}{W - (k + l)} \sum_{m=0}^{(W-1)-(k+l)} |x[n+m] - x[n+m-k] - x[n+m-l] + x[n+m-k-l]|$$

where x[n] is the signal being analyzed (e.g., the input signal), W is the window length for analysis, k and l are lag parameters, and $\gamma_n[k, l]$ is the AMDF of the signal x[n] evaluated at time instant n. The AMDF takes the signal x[n] and windows it with a W-sample window (e.g., a 45 ms sample). The signal x[n] is then delayed by k (e.g., 10 ms) and then delayed again by l (e.g., 15 ms). In this manner, the AMDF compares the signal x[n] to a first delayed version of itself (i.e., delayed by k as indicated by x[n+m−k]) and a second delayed version of itself (i.e., delayed by l as indicated by x[n+m−l]). The sum of this computation is then averaged over the entire window, which is defined by the sample length W and the lag parameters k and l (e.g., W+k+l). In some embodiments, the lag parameters are the same (i.e., k=l) while, in other embodiments, the lag parameters are different.

Additionally, the AMDF equation shown above accounts for potential beat frequencies (or other like inter-harmonics represented mathematically, e.g., by the term x[n+m−k−l]) that may be present in the signal x[n]. In alternative embodiments, however, the term, x[n+m−k−l], is not included.

In the equation shown above, the AMDF is normalized to 1. In alternative embodiments, however, the AMDF is not normalized. The non-normalized function can be generated by removing "(k+l)" from the aforementioned upper bound summation and removing the following term from the equation:

$$\frac{1}{W-(k+l)}$$

Once the 2-D function is calculated, a strength calculation is performed, at 448. This strength calculation is discussed below in reference to FIGS. 5 and 6. FIG. 5 is a three-dimensional data representation of the 2-D AMDF, where the x-axis is lag l, the y-axis is lag k, and the z-axis is the AMDF strength. FIG. 6 is a two-dimensional data representation of the 2-D AMDF, where the x-axis is lag l, the y-axis is lag k and the AMDF strength is represented by the shading (or by the color in a color version of the figure).

To perform the strength calculation, the multi-pitch detection process first calculates the extrema of the 2-D function (i.e., the minima and maxima). This calculation can be done in any known manner. As shown in the example shown in FIGS. 5 and 6, the AMDF values for the minimum D1 and four adjacent maxima P1, P2, P3, and P4 are calculated and labeled.

Next, the multi-pitch detection process calculates the strength of each extrema. The strength can be generally defined by comparing the 2-D function value of an extremum to the 2-D function value of one or more opposite extremum. In embodiments where the 2-D function is the 2-D ACF, the multi-pitch detection process calculates the rise strength of the local maximum of the 2-D ACF by comparing the 2-D ACF value of the local maximum to the 2-D ACF value of one or more local minima. For purposes of the 2-D AMDF embodiment, the multi-pitch detection process calculates the dip strengths of each local minima by comparing the 2-D AMDF strength value of a minimum to a 2-D AMDF strength value of one or more local maxima. In other embodiments, however, the 2-D AMDF strength value of a minimum can be compared to any function calculated based on the 2-D AMDF strength value of one or more local maxima.

The local maxima can be in any direction relative to the minimum and is not necessarily adjacent to the minimum. For example, in some embodiments, the 2-D AMDF strength value of a minimum can be compared to a 2-D AMDF strength value of four adjacent maxima (see, for example, FIG. 5). In some embodiments, the 2-D strength AMDF value of a minimum can be compared to a 2-D AMDF strength value of two adjacent maxima (e.g., edge of profile). In other embodiments, the 2-D AMDF strength value of a minimum can be compared to a 2-D AMDF strength value of one or more non-adjacent maxima.

In some embodiments, the multi-pitch detection process interpolates the AMDF strength value of the one or more local maxima and compares that interpolated strength value to the AMDF of the minimum. For example, as shown in FIG. 5, the AMDF strength values of maxima P1, P2, P3, and P4 are used to produce the interpolated strength value X1. The dip strength can be defined as being the difference between the interpolated strength value X1 and the AMDF strength value of the minimum D1. The interpolated strength value X1 can be calculated in any manner, such as, for example, using a Kernel-Based method.

Since the dip strength is the difference between the interpolated strength value X1 and actual AMDF strength values, it captures to what degree the AMDF falls at a local minimum relative to its nearest maxima. This can be a more accurate description of the significance of the local minima, and is less susceptible to the effects of practical signal processing applications. In general, practical signal processing applications cause extrema to decrease inaccurately in strength. Therefore, the dip strength instead can give a more accurate description of the dip between minima and maxima. In this manner, defining the strengths of dips and using them instead of the actual AMDF strength values at the corresponding minima locations can result in a more accurate method of estimating the pitch. In embodiments where the 2-D ACF is used, however, it may not be necessary to interpolate a value to calculate the strength. The strength (i.e., the peak strength) can be calculated, for example, by comparing the ACF strength value of a maximum to zero. In this manner, the strength of a peak can simply be the ACF strength value of that maximum.

The process of calculating strengths is performed for each frame. Once completed, a frame strength is identified for each frame. The frame strength is designated as the greatest strength calculated within that frame. For example, if a frame included a first minimum having a strength of 0.8 and a second minimum having a strength of 0.5, the frame strength would be 0.8 because that was the greatest strength calculated for that frame. The 0.5 strength corresponding to the second minimum would be ignored for further processing in this example.

Figure 7:
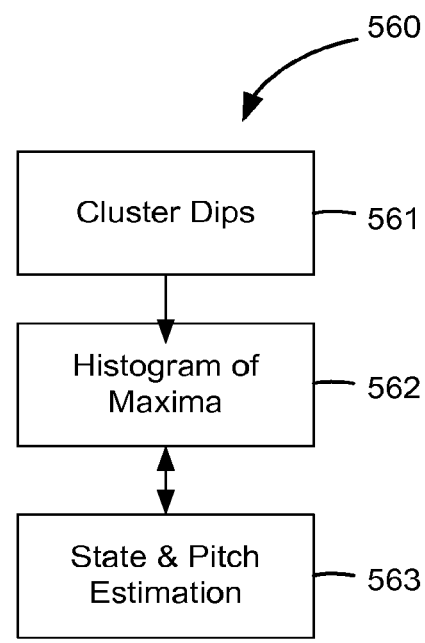
FIG. 7 is a flow chart of a method according to an embodiment.

Once the strengths are calculated for all channels, the strengths can be used to estimate the pitch of the components of the input signal. This can be done in a number of ways, the first of which is described in FIG. 7. FIG. 7 is a flow chart of a method 560 for estimating pitch using strengths and histograms. This method is described with respect to the 2-D AMDF. It should be understood, however, that the same processes can be performed for any 2-D function (e.g., 2-D ACF). The method includes clustering the strengths, 561. More particularly, for each channel, a summary AMDF strength is obtained by summing the AMDF strengths from all channels lower in frequency than itself to preserve the strengths. Following this, the location with the maximum dip strength for that summary is identified, and this single location (k,l) is passed to the histogram stage. For each channel, this is done and the maximum dip due to the summary across all channels below it is sent to the next stage.

Figure 8:
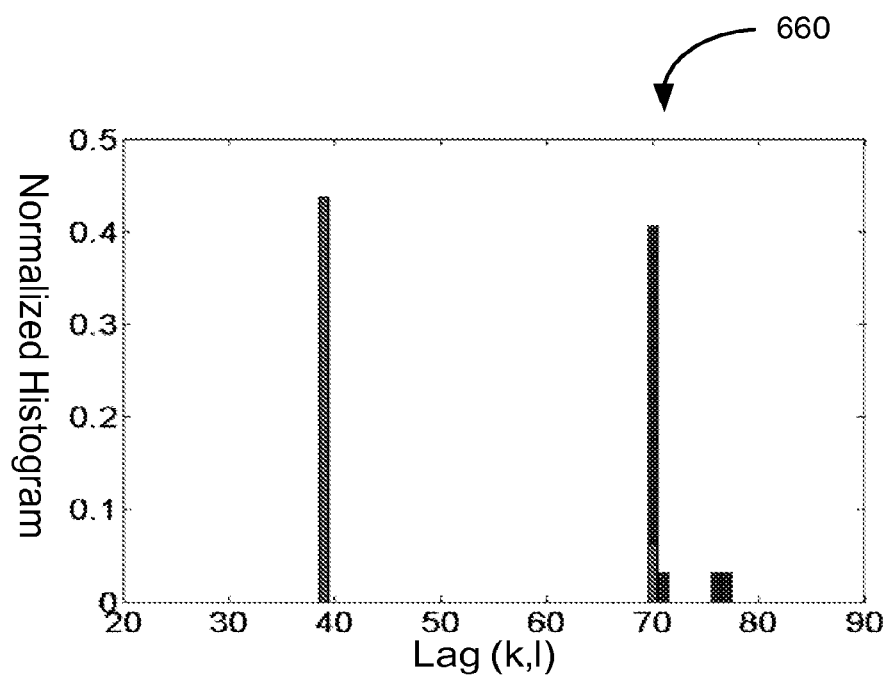
FIG. 8 is a graphical illustration of a histogram according to an embodiment.

The clustered information are plotted on a histogram, at 562. More particularly, the locations of the maximum dip strengths collected across all channels are plotted on a histogram. The peak locations in the k dimension are treated separately from those in the l dimension. The histogram can be normalized so that the sum of all its elements from both dimensions equals one. In embodiments where a frame includes two voiced speakers, the histogram shows two distinct peaks. An example of this embodiment is shown in FIG. 8. The histogram 660 of FIG. 8 shows peaks in two locations (40 samples and 70 samples). The peaks have similar strengths (or clusters), which indicates that both speakers in the frame are evenly voiced (e.g., strong voiced). In a color version of the figure, it is shown that the peak at 40 samples is located in the k dimension while the peak at 70 samples is located in the l dimension. In instances where one speaker is stronger voiced than the other speaker in the frame, the strengths (clusters) of the stronger voiced speaker is greater than that of the weaker speaker.

In embodiments where a frame includes a single voiced speaker, the histogram shows a single peak (e.g., at the same location in both dimensions). In embodiments where there are no voiced speakers in a frame, the histogram shows no distinct peaks because the maxima locations across channels would not cluster together due to lack of periodicity. Thus, the histogram peaks can be used to identify the pitch of one or two speakers in this example.

The threshold for determining a peak for purposes of identifying a voiced speaker can be any suitable threshold. For example, in some embodiments, the threshold can be 0.2. In this embodiment, a frame that does not have a peak on the histogram greater than the 0.2 threshold is considered an unvoiced frame (i.e., there are no substantially periodic sources in the frame). When a frame has a single peak on the histogram that crosses the 0.2 threshold, the frame is inferred to have a single speaker (i.e., there is no second speaker or no substantially periodic source present). Likewise, when a frame has two peaks on the histogram that cross the 0.2 threshold, the frame is inferred to have two speakers.

In some embodiments, the results of the histogram analysis can be stored in a database. This can be done to keep track of the number of speakers (or substantially periodic sources) over time. The database can be used to analyze/evaluate the signal over a period of time (e.g., over the duration of a conversation). As the AMDF and histogram collection evolves over time, the peak due to the fading speaker gets weaker, and the one due to the remaining speaker gets stronger. This is used to predict which speaker is fading out of voicing. A reverse trend is seen when a speaker begins voicing: the strong peak due to the single speaker gets weaker and a second peak starts to appear corresponding to the second speaker. In this manner, the evolution of histograms can be used to detect the beginning or ending of voicing of each speaker.

The state of the voiced component(s) is analyzed, at 563. The states for this particular embodiment can be defined as follows:

State 0: no voiced speakers;
State 0.5: one voiced speaker fading;
State 0.5: one voiced speaker rising;
State 1: one voiced speaker;
State 1.5: one voiced speaker, and another voiced speaker fading;
State 1.5: one voiced speaker, and another voiced speaker rising; and
State 2: two voiced speakers.

These states are estimated by analyzing the behavior of the 2-D AMDF as well as the evolution of the histograms, as described above. Although the states defined above have a particular state number and description, in other embodiments, any number of states with a corresponding state number and/or description can exist. For example, instead of "State 0.5" being used to describe both "one voiced speaker fading" and "one voiced speaker rising", there can be two different state numbers used for each of these descriptions (e.g., "State 0.25" and "State 0.75").

Once the state of the speech components are determined, the locations of the peaks of the histograms can be used to label the pitch estimates of both speakers. The location of the first peak can be referred to as the first pitch estimate, and the location of the second peak can be referred to as the second pitch estimate. The histogram values at those locations are labeled the confidences of the pitch estimates.

In some embodiments, the method can also include a speaker segregation process that enhances the vocals of the weaker speaker when two speakers are present in a signal. In general, when a signal includes a weak-voiced speaker in the presence of a strong-voiced speaker (e.g., where the target-to-masker ratio (TMR) is very low), the pitch confidence of the strong-voiced speaker is very high while the pitch confidence of the weak-voiced speaker is very low. In some instances, the pitch confidence of the weak-voiced speaker is so low that it is not identified as being voiced. To resolve this issue, the speaker segregation process can be used to identify the pitch estimate with the strongest confidence and remove its harmonics from the mixture by using, for example, a speech segregation process. The speech segregation process was discussed briefly above with respect to FIG. 3. A detailed description of the methods and uses of the speech segregation process can be found in U.S. Patent Provisional Application No. 61/299,776, entitled "Method to Separate Overlapping Speech Signals From a Speech Mixture for Use in a Segregation Process," filed Jan. 29, 2010; the disclosure of which is hereby incorporated by reference in its entirety.

Once the information from the stronger speaker is removed using the speech segregation process, the pitch of the weaker speaker can be identified by calculating the one-dimensional version of the AMDF of the remaining signal, as defined in the equation below:

$$AMDF[k, l] = \sum_{m=0}^{W} |x[n+m] - x[n+m-k]|$$

where the terms are the same as in the case of the 2-D AMDF above. Similar to the method 440 shown in FIG. 4, the dip strengths of the AMDF are calculated and then plotted across channels to develop a histogram of dips. The location of the maximum of the histogram is then identified as the pitch period of the second speaker. If the confidence of this pitch estimate is above a certain threshold (e.g., 0.2), the second speaker is said to be voiced and the pitch period is declared as the estimate for the second speaker.

Figure 9:
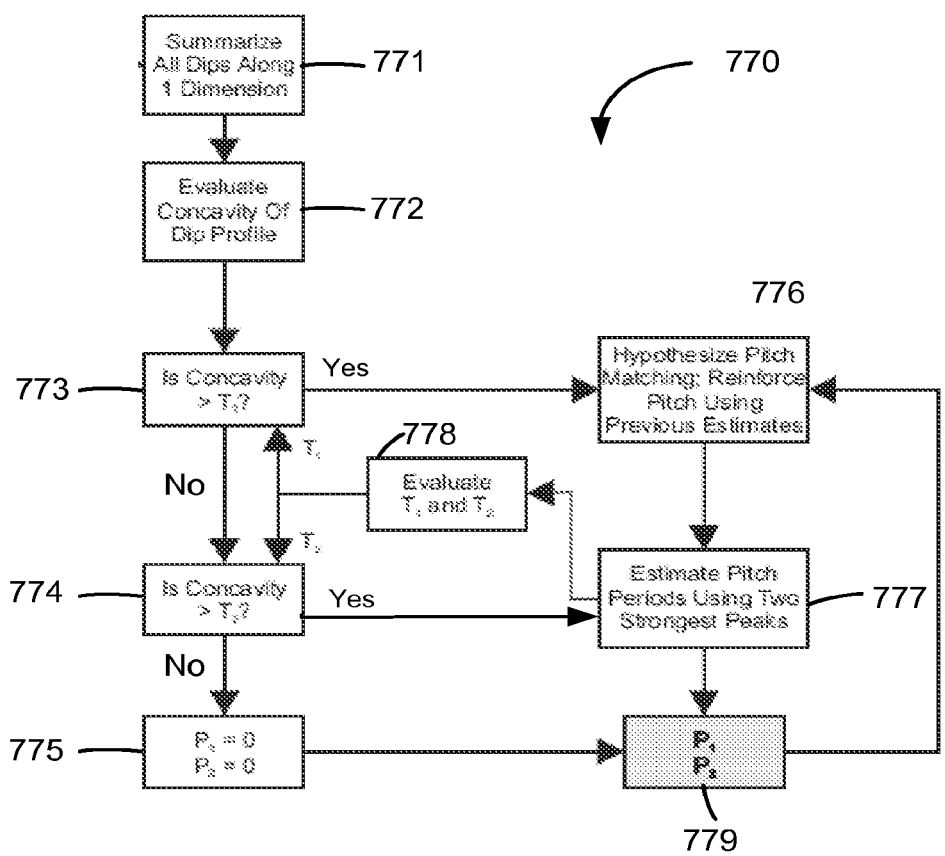
FIG. 9 is a flow chart of a method according to an embodiment.
Figure 10:
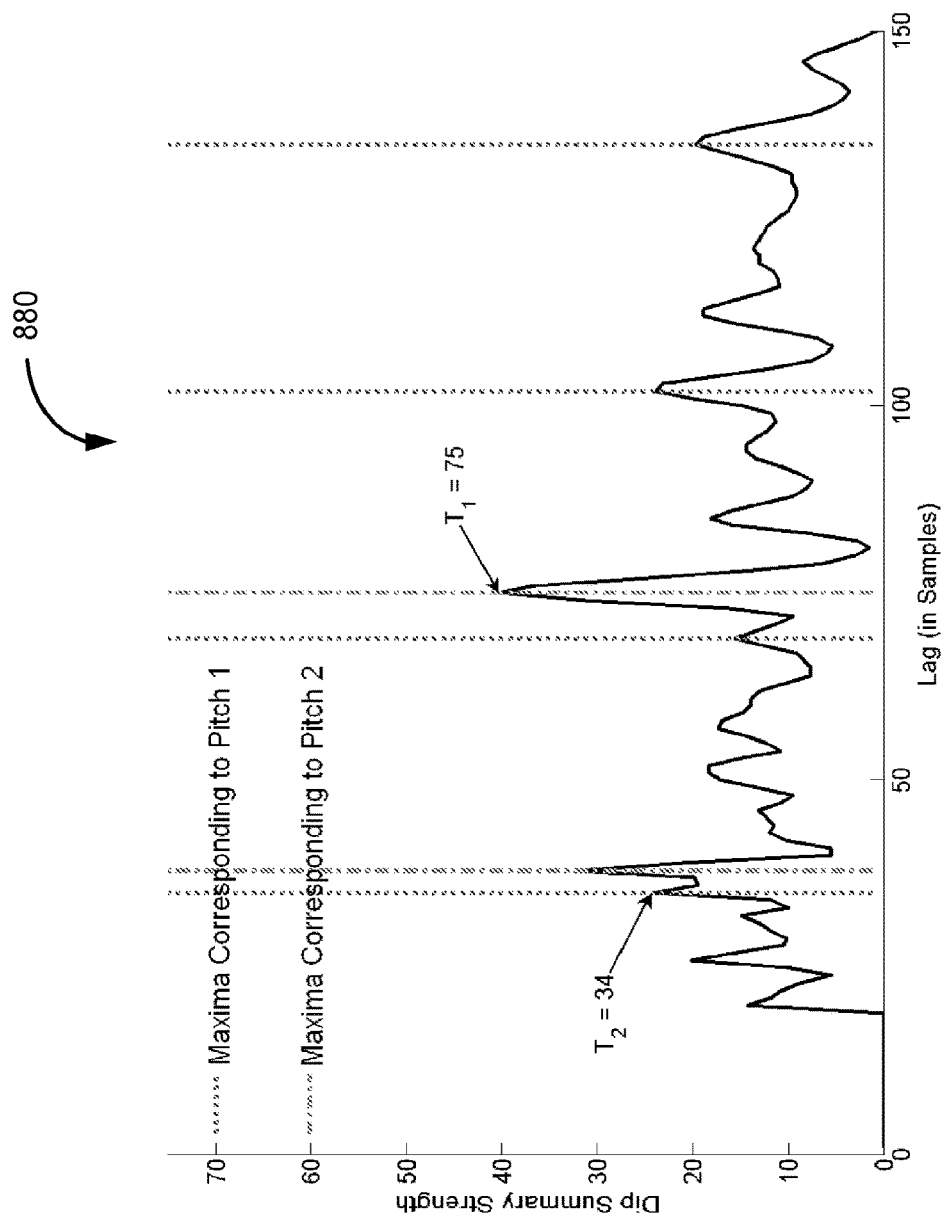
FIG. 10 is a graphical illustration of a dip summary strength according to an embodiment.

A second method of analyzing the strength information is described in FIG. 9, according to another embodiment. FIG. 9 is a flow chart of a method 770 for estimating pitch using concavity calculations. The method 770 includes clustering the frame strengths across all channels to produce a profile, at 771. More particularly, each of the frame strengths in a given channel are added together (across either the k dimension or the l dimension) so that each channel is associated with a single strength. These strengths make up the profile. An example of a dip profile 880, as it relates to embodiments using 2-D AMDF, is illustrated in FIG. 10. In this particular illustration, two speakers are present as indicated by the maxima values.

Next, the concavity of the profile is calculated, at 772. The concavity of the profile can be determined, for example, in the following manner. First, the local maxima of the profile are identified. Continuing with the 2-D AMDF example, the local maxima of the dip profile are identified. The maxima are generally located at the lags equal to the pitch period (or its multiples) and have a strong clustering of frame strengths. As shown in FIG. 10, the global maxima are located at the 34$^{th}$ sample and the 75$^{th}$ sample, and the local maxima are identified by the vertical dotted lines.

After the local maxima are identified, they are grouped according to the greatest common factor (GCF). For example, if the maxima identified are (30, 50, 60, 90, 100, 120, 150, 180, 200), then group I is {30, 60, 90, 120, 150 and 180} because the GCF is 30, and group II is {50, 100, 150, 200} because the GCF is 50. Here, the maximum at 150 is contained in both the groups I and II. The maxima can be grouped into any number of groups depending on the common factors of the maxima identified. Additionally, any of the maxima can be a member of more than one group so long as that maxima shares a common factor with the group (e.g., the maximum at 150). In general, a greater number of groups will exist for portions of the signal having voiced components.

Next, a group concavity is calculated for each group by first evaluating the second derivative of the dip profile at all maxima within that group and then averaging these values. Thus, the group concavity is a single value. For example, group I (described above) can have a single group concavity value of 0.8 obtained by averaging the different concavity values for each of the six (6) maxima within that group. Similarly, group II (described above) can have a single group concavity value of 0.5 obtained by averaging the different concavity values for each of the four (4) maxima within that group.

The group concavity having the greatest value is considered the concavity of the dip profile. In the previous example, the concavity of the dip profile is 0.8 (corresponding to group I).

In general, the dip profile and its corresponding concavity can be used to identify the number of voiced speakers present in a given frame. Consider the following four scenarios: (1) two simultaneous voiced speakers with distinct pitches present, (2) only one speaker present, (3) no speaker present, and (4) two simultaneous voiced speakers with one pitch being a multiple of the other. In the first scenario, the dip profile will exhibit two distinct peaks at the pitch periods of the two speakers (see, for example, FIG. 10). In the second scenario, the dip profile will also exhibit peaks at the multiples of the pitch period—one at the pitch period (e.g., the 30$^{th}$ sample), others at its multiples (e.g., the 60$^{th}$ and 90$^{th}$ samples), and sometimes at its half multiples (e.g. the 15$^{th}$ sample)—until the maximum lag (e.g., the 150$^{th}$ sample). In the third scenario, the dip profile will not exhibit any distinct peaks and the concavity value will be relatively low compared to those in the other scenarios. In the last scenario, however, the dip profile will exhibit at least one strong maximum having a relatively sharp peak and a concavity value that is distinctly higher than those in the other scenarios. This higher concavity value can help to differentiate between frames where there is no voice, voicing with no pitch-matching, or voicing with pitch-matching. In some instances, the dip profile in this scenario can also include other peaks that have concavity values comparable to those in the one speaker scenario.

To do this, the method includes comparing the concavity of the current dip profile to a threshold $T_1$, 773. If the concavity is greater than the threshold $T_1$, then the concavity value suggests that two speakers are present with substantially the same pitch (i.e., matching pitch). The dip profile is then processed at 776 and 777, which are described in more detail below.

If the concavity is less than the threshold $T_1$, the method includes comparing the concavity to another, lower threshold $T_2$, at 774. If the concavity is greater than the threshold $T_2$, then the concavity value suggests that at least one speaker is present. The dip profile is then processed at 777, which is described in more detail below. If the concavity is less than the threshold $T_2$, then the concavity value suggests that there are no speakers present and the pitch is set to zero (or some other nominal value), 775.

In some embodiments, the thresholds $T_1$ and/or $T_2$ are fixed values. In other embodiments, however, the thresholds $T_1$ and/or $T_2$ are dynamically adjustable based on, for example, parameters of the input signal. For example, in some embodiments, the values of the thresholds $T_1$ and/or $T_2$ are each a function of the confidences of the pitch estimates from the previous frames (see, for example, step 778). Although the values of the thresholds $T_1$ and/or $T_2$ can be adjustable, in some embodiments, the lowest and highest possible values the thresholds $T_1$ and/or $T_2$ can take are fixed values. In some embodiments, when it is determined that no speakers are in a frame (i.e., the concavity did not exceed threshold $T_1$ or threshold $T_2$), the thresholds $T_1$ and/or $T_2$ can be reset to a default value so that the concavity of the next frame is compared to these default values (see, for example, step 778).

After the concavity is evaluated with respect to the thresholds $T_1$ and $T_2$, one or more pitch periods are estimated, at 777. Although FIG. 10 indicates that this estimation can be performed using the two strongest peaks of the profile, in other embodiments, one or more pitch periods can be estimated using any number of peaks (e.g., one peak or three peaks). In some embodiments, the pitch periods can be estimated using dips, as in the case of the 2-D ACF.

In some embodiments, when there are two or more groups that have concavities that exceed the threshold $T_2$ but do not exceed the threshold $T_1$, the groups can be sorted in descending or ascending order of concavity. For each of the first two groups (e.g., the first two groups arranged in decreasing order of group concavity value), the strongest maximum therein is identified as the corresponding pitch estimate, and the strengths of these maxima are identified as the confidences of the pitch estimates. These yield the pitch estimates $P_1$ and $P_2$ (see step 779) with their corresponding confidences $C_1$ and $C_2$. In some embodiments, if either of the confidences $C_1$ or $C_2$ is less than a pre-determined threshold $T_C$, the corresponding pitch estimate is considered unreliable and is set to zero. In instances where one or both of the previous pitch estimates (i.e., from the previous frame) are not close to the current pitch estimates but closer to a multiple of the current pitch estimates, the current pitch estimates are corrected to match the pitch estimates from the previous frames.

In instances where the concavity of the dip profile exceeds threshold $T_1$ (see step 773), the method further includes hypothesizing pitch-matching between speakers (i.e., one pitch is a multiple of the other), 776. The group whose concavity exceeds the threshold $T_1$ is selected to find the pitch candidates. The location of the maximum of the dip profile is hypothesized as the first pitch estimate, and is matched to its previous pitch estimate (i.e., from the previous frame). The second pitch estimate is found by finding the maximum in the selected group which is closest to the other pitch estimate from the previous frame. In instances where the two estimates from the previous frame are close to each other, the same maximum from the current frame is assigned to both pitch estimates $P_1$ and $P_2$. Finally, the strengths of the dip profiles at $P_1$ and $P_2$ are called the confidences of the estimates, $C_1$ and $C_2$ respectively. If either of these confidences falls below the confidence threshold $T_C$, the corresponding pitch estimate and confidence are set to zero.

In some embodiments, the multi-pitch detection process can include processes to assign the pitch estimates to the appropriate speaker in the frame. In some embodiments, the multi-pitch detection process can include processes that extract at least one of the identified pitches from the frame. In some embodiments, the multi-pitch detection process can include processes that extract the signal components from the frame other than those components that correspond to the identified pitches.

Figure 11:
FIG. 11 is a graphical representation of speech, before multi-pitch processing, with background noise.
Figure 12:
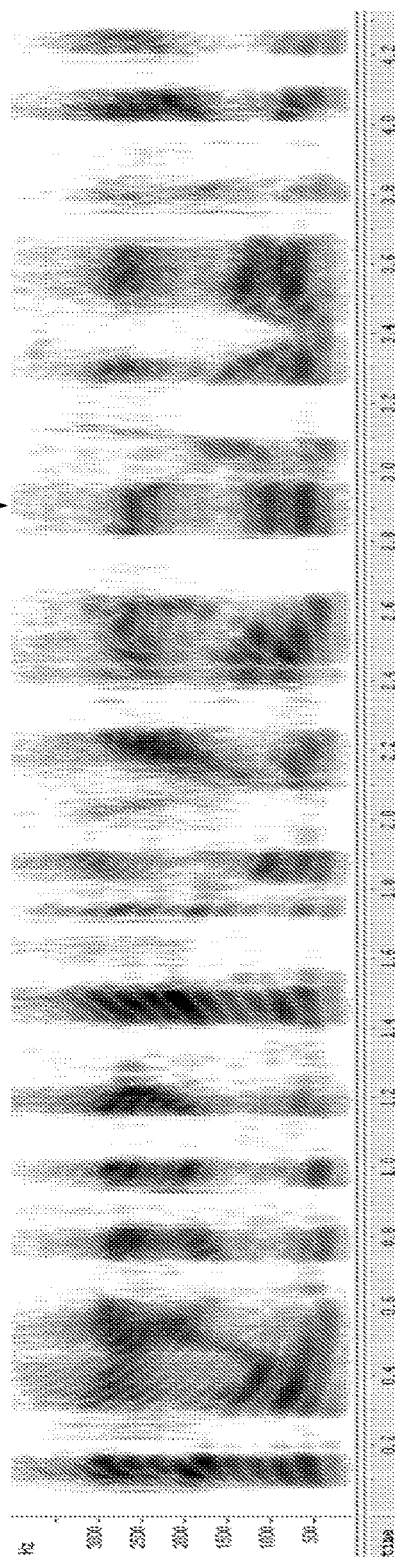
FIG. 12 is a graphical representation of the speech illustrated in FIG. 11 after multi-pitch processing.

FIGS. 11 and 12 illustrate examples of the multi-pitch detection process in practical applications. FIG. 11 is graphical representation of an input signal 990 having a speech component as well as undesired unvoiced components (e.g., noise). FIG. 12 is a graphical representation the input signal 992 after being processed by the multi-pitch detection process. Although not explicitly shown, the multi-pitch detection process identified the speech component(s) of the input signal and then these component(s) were extracted from the input signal (e.g., using a speech segregator process). The result is a cleaner signal that is less susceptible to noise.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the 2-D AMDF described above can be modified to a 3-D AMDF so that three pitch periods (e.g., three speakers) can be estimated simultaneously. In this particular instance, the 3-D AMDF would be defined as follows:

$$\gamma_n[k, l, p] = \frac{1}{W - (k + l + p)} \quad (2.4)$$

$$\sum_{m=0}^{(W-1)-(k+l+p)} |x[n+m] - x[n+m-k] - x[n+m-l] - $$

$$x[n+m-p] + x[n+m-k-l] + x[n+m-l-p] + $$

$$x[n+m-p-k] - x[n+m-k-l-p]|$$

where x[n] is the signal being analyzed, W is the window length for analysis (AMDF calculation), k, l, and p are lag parameters and $\gamma_n[k, l, p]$ is the AMDF of the signal x[n] evaluated at time instant n. The AMDF can further be modified to account for four or more pitch periods in a signal. In this manner, the AMDF is an adaptive equation that can easily be modified to accommodate any number components (e.g., speakers or substantially periodic sources).

Although the 3-D AMDF is illustrated above as being normalized and having multiple terms, in other embodiments, the 3-D AMDF may not include the additional terms necessary for normalization, reducing beat frequencies (or other like inter-harmonics), and/or the like. For example, the 3-D AMDF can simply include the terms necessary to compare the signal x[n] to three delayed versions of itself.

Although the systems and methods discussed above are described in reference to the average magnitude difference function (AMDF) to detect a pitch period of a component, in some embodiments and as discussed above, the pitch period of the speaker can be determined using an autocorrelation function (ACF). The ACF is computed by multiplying an input signal with a delayed version of itself as shown below:

$$r_n[k, l] = $$

$$\frac{1}{W - (k + l)} \sum_{m=0}^{(W-1)-(k+l)} x[n+m] \cdot x[n+m-k] \cdot x[n+m-l] \cdot x[n+m-k-l]$$

Rather than showing dips at the lag values equal to the periodicity of the input signal like the AMDF, the ACF shows a peak at each of those values. Therefore, the pitch period is estimated by identifying the lag that has the maximum peak. In some embodiments, the 2-D ACF can be modified to a 3-D ACF in a manner similar to that described above with respect to 3-D AMDF.

In some embodiments, the multi-pitch detection process can be used to process signals in real-time. For example, the multi-pitch detection can be used to process input and/or output signals derived from a telephone conversation during that telephone conversation. In other embodiments, however, the multi-pitch detection process can be used to process recorded signals.

Although the multi-pitch detection process is discussed above as being used in audio devices, such as cell phones, for processing signals with a relatively low number of components (e.g., two or three speakers), in other embodiments, the multi-pitch process can be used on a larger scale to process signals having any number of components. The multi-pitch process can identify 20 speakers from a signal that includes noise from a crowded room. It should be understood, however, that the processing power used to analyze a signal increases as the number of speech components to be identified increases. Therefore, larger devices having greater processing power, such as supercomputers or mainframe computers, may be better suited for processing these signals.

In some embodiments, any one of the components of the device 100 shown in FIG. 1 or any one of the modules shown in FIG. 2 or 3 can include a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate.

What is claimed is:

1. A non-transitory processor-readable medium storing code representing instructions to cause a processor to perform a process, the code comprising code to:
    compare an input signal having a first component and a second component to a first delayed version of the input signal and a second delayed version of the input signal to produce a function, the input signal being an audio input signal;
    compare a first value of the function at each extremum from a plurality of extrema of the function to a second value of the function at each of at least one opposite extremum of the function to produce a computed value, the computed value being a function of that extremum and that at least one opposite extremum;
    calculate a strength of each extremum from the plurality of extrema based on the computed value for that extremum, an extremum from the plurality of extrema having a first strength greater than the strength for the remaining extrema from the plurality of extrema being associated with the first component of the input signal;
    remove from the input signal a pitch of the first component associated with the first strength, the remaining extrema from the plurality of extrema defining a first set of remaining extrema and a second set of remaining extrema, an extremum from the first set of remaining extrema having a second strength greater than the strength for the extrema from the second set of remaining extrema being associated with a pitch of the second component of the input signal; and
    send a signal associated with interference reduction based on the input signal and the first strength greater than the strength for the remaining extrema from the plurality of extrema.

2. The non-transitory processor-readable medium of claim 1, wherein the component of the input signal is a first component associated with a first source, the input signal including a second component associated with a second source different from the first source.

3. The non-transitory processor-readable medium of claim 1, wherein the component of the input signal is substantially periodic.

4. The non-transitory processor-readable medium of claim 1, wherein the component of the input signal is a first component being a voiced speech signal, the input signal including a second component being noise.

5. The non-transitory processor-readable medium of claim 1, wherein the strength for each extremum from the plurality of extrema is a difference between the calculated value of the function for that extremum and a value of that extremum.

6. The non-transitory processor-readable medium of claim 1, the code further comprising code to:
    receive the input signal from a single microphone.

7. The non-transitory processor-readable medium of claim 1, wherein the component of the input signal is a first component, the input signal including a second component and a third component,
    the code to compare including code to compare the input signal to a third delayed version of the input signal, the function being a three-dimensional function.

8. The non-transitory processor-readable medium of claim 1, the code further comprising code to:
    sample the input signal at a rate of approximately 100 frames per second, each frame having at least a pitch period associated with the component of the input signal,
    the code to compare includes code to compare each frame to a first delayed version of the frame and a second delayed version of the frame such that a strength is calculated for each extremum from the plurality of extrema of the frame.

9. The non-transitory processor-readable medium of claim 1, wherein the processor is a digital signal processor of a device of a user, the code being downloaded to the non-transitory processor-readable medium.

10. The non-transitory processor-readable medium of claim 1, wherein the plurality of extrema are a plurality of minima of the function, the opposite extrema are maxima, the strength is a dip strength,
    the code to compare the value including code to compare the value of the function at each minimum from the plurality of minima of the function based on the value of each of the at least one maximum of the function to produce the computed value,
    the code to calculate including code to calculate the dip strength of each minimum from the plurality of minima based on the computed value at that minimum, the minimum from the plurality of minima having the dip strength greater than the dip strength for the remaining minima from the plurality of minima being associated with the component of the input signal.

11. The non-transitory processor-readable medium of claim 1, wherein the plurality of extrema are a plurality of maxima of the function, the opposite extrema are minima, the strength is a peak strength,
    the code to compare the value including code to compare the value of the function at each maximum from the plurality of maxima of the function based on the value of each of the at least one minimum of the function to produce the computed value,
    the code to calculate including code to calculate the peak strength of each maximum from the plurality of maxima based on the computed value at that maximum, the maximum from the plurality of maxima having the peak strength greater than the peak strength for the remaining maxima from the plurality of maxima being associated with the component of the input signal.

12. A method, comprising:
    comparing, at a processor, an input signal having a first component, a second component, and a third component to a first delayed version of the input signal and a second delayed version of the input signal to produce a function, the input signal being an audio input signal;

comparing (1) a first value of the function at each extremum from a plurality of extrema of the function to a second value of the function at each of at least one opposite extremum of the function and (2) the input signal to a third delayed version of the input signal to produce a computed value, the computed value being a function of that extremum and that at least one opposite extremum, the function being a three-dimensional function;

calculating a strength of each extremum from the plurality of extrema based on the computed value for that extremum, an extremum from the plurality of extrema having the strength greater than the strength for the remaining extrema from the plurality of extrema being associated with the component of the input signal; and sending a signal associated with interference reduction based on the input signal and the strength greater than the strength for the remaining extrema from the plurality of extrema.

13. The method of claim 12, wherein the component of the input signal is a first component associated with a first source, the input signal including a second component associated with a second source different from the first source.

14. The method of claim 12, wherein the component of the input signal is substantially periodic.

15. The method of claim 12, wherein the component of the input signal is a first component being a voiced speech signal, the input signal including a second component being noise.

16. The method of claim 12, wherein the strength of each extremum from the plurality of extrema is a difference between the computed value for that extremum and the first value of that extremum.

17. The method of claim 12, the code further comprising code to:

receiving the input signal from a single microphone.

* * * * *